United States Patent
Ben Meir

(10) Patent No.: US 9,493,205 B2
(45) Date of Patent: Nov. 15, 2016

(54) TRICYCLE WITH FOLDABLE DOUBLE-WHEEL ASSEMBLY

(75) Inventor: Ilan Ben Meir, Hong Kong (CN)

(73) Assignee: SMART TRIKE MNF PTE LTD., Singapore (SG)

( * ) Notice: Subject to any disclaimer, the term of this patent is extended or adjusted under 35 U.S.C. 154(b) by 0 days.

(21) Appl. No.: 14/388,087

(22) PCT Filed: Jun. 29, 2012

(86) PCT No.: PCT/CN2012/077876
§ 371 (c)(1),
(2), (4) Date: Sep. 25, 2014

(87) PCT Pub. No.: WO2013/181872
PCT Pub. Date: Dec. 12, 2013

(65) Prior Publication Data
US 2015/0048585 A1    Feb. 19, 2015

(30) Foreign Application Priority Data

Jun. 4, 2012    (CN) .................... 2012 2 0260404 U

(51) Int. Cl.
| | |
|---|---|
| *B62K 5/02* | (2013.01) |
| *B62K 5/06* | (2006.01) |
| *B62K 9/02* | (2006.01) |
| *B62K 15/00* | (2006.01) |
| *B62M 1/38* | (2013.01) |

(52) U.S. Cl.
CPC ................ *B62K 15/00* (2013.01); *B62K 5/02* (2013.01); *B62K 5/06* (2013.01); *B62K 9/02* (2013.01); *B62K 15/006* (2013.01); *B62M 1/38* (2013.01)

(58) Field of Classification Search
CPC .. B62K 15/00; B62K 15/006; B62K 15/008; B62K 5/02; B62K 5/06; B62K 9/02
See application file for complete search history.

(56) References Cited

U.S. PATENT DOCUMENTS 4,540,192 A * 9/1985 Shelton .......................... 280/282
5,240,267 A * 8/1993 Owsen .......................... 280/240
(Continued)

FOREIGN PATENT DOCUMENTS

| CA | 2628447 | 10/2009 |
|---|---|---|
| CN | 2652793 | 11/2004 |

(Continued)

*Primary Examiner* — Joseph Rocca
*Assistant Examiner* — Maurice Williams
(74) *Attorney, Agent, or Firm* — Roach Brown McCarthy & Gruber, P.C; Kevin D. McCarthy

(57) ABSTRACT

A tricycle with foldable double wheel assembly comprises: a frame, a single-wheel assembly and a double-wheel assembly respectively disposed at front end and rear end of the frame, and a handlebar assembly matching with the single-wheel assembly to control steering, the double-wheel assembly comprising a supporting beam and two wheels disposed on the supporting beam, wherein the supporting beam comprises two branches of same structures, the two wheels being respectively disposed on the two branches, the supporting beam having a first stable state where the two branches are open, and a second stable state where the two branches are put together side by side. The supporting beam in the double-wheel assembly of the present utility model is foldable so that it is not necessary to occupy a relatively large space to carry/store the tricycle and the usage convenience of the tricycle is thus improved.

8 Claims, 5 Drawing Sheets

(56) References Cited

U.S. PATENT DOCUMENTS

| | | | |
|---|---|---|---|
| 6,485,039 B1* | 11/2002 | Ming-Fu | 280/87.041 |
| 6,695,327 B1* | 2/2004 | Maggiore et al. | 280/87.051 |
| 6,719,310 B1* | 4/2004 | Lin | 280/87.041 |
| 7,681,895 B2* | 3/2010 | Chen | 280/87.041 |
| 2003/0080533 A1* | 5/2003 | Ma | 280/287 |
| 2003/0085539 A1* | 5/2003 | Cochimin | 280/38 |
| 2005/0156396 A1* | 7/2005 | Teng et al. | 280/87.041 |
| 2009/0008164 A1 | 1/2009 | Shapiro | |
| 2009/0115160 A1* | 5/2009 | Chiu | 280/278 |
| 2011/0089656 A1* | 4/2011 | Chiu et al. | 280/87.041 |
| 2012/0043733 A1* | 2/2012 | Tsai | 280/87.05 |
| 2013/0140787 A1* | 6/2013 | Ko | 280/221 |

FOREIGN PATENT DOCUMENTS

| | | |
|---|---|---|
| CN | 2931261 | 8/2007 |
| JP | H0853091 | 2/1996 |

* cited by examiner

TRICYCLE WITH FOLDABLE DOUBLE-WHEEL ASSEMBLY

TECHNICAL FIELD

The utility model relates to tricycles. More specifically, it relates to a tricycle with foldable double-wheel assembly.

BACKGROUND ART

Existing tricycles, especially tricycles suitable for babies or children to ride, generally have a frame, a single-wheel assembly and a double-wheel assembly respectively disposed at the front end and the rear end of the frame, and a handlebar assembly matching with the single-wheel assembly to control steering. The single-wheel assembly comprises a steering wheel and pedals for driving the steering wheel to roll. The double-wheel assembly comprises two wheels and a supporting beam horizontally coupling the two wheels spaced apart. The tricycle may be ridden by controlling the handlebar assembly and pressing the pedals by feet. Since the supporting beam is relatively large, the two-wheel assembly usually occupies a relatively large space so that it is not convenient to carry/store the tricycle.

SUMMARY OF THE UTILITY MODEL

The technical problem to be solved by the utility model is to overcome the deficiencies existed in the prior art. The utility model provides a tricycle, where the supporting beam in its double-wheel assembly is foldable. It is not necessary to occupy a relatively large space to carry/store the tricycle so that the usage convenience of the tricycle is improved.

The present utility model discloses a tricycle with foldable double-wheel assembly, comprising: a frame, a single-wheel assembly and a double-wheel assembly respectively disposed at front end and rear end of the frame, and a handlebar assembly matching with the single-wheel assembly to control steering, the double-wheel assembly comprising a supporting beam and two wheels disposed on the supporting beam, wherein the supporting beam comprising two branches of same structures, the two wheels being respectively disposed on the two branches, the supporting beam having a first stable state where the two branches are open and a second stable state where the two branches are put together side by side.

The supporting beam further comprises a coupling assembly for coupling the frame, a pivot for rotatablely coupling the two branches to the coupling assembly, and two locating members respectively for locating the two branches in one of the first stable state and the second stable state.

The coupling assembly comprises a frame coupling portion coupled to the frame and a branch coupling portion coupled to the two branches. The branch coupling portion comprises a circular plate, the circular plate having disposed thereon a central hole, two first locating holes respectively corresponding to a first stable state of the two branches, and two second locating holes respectively corresponding to a second stable state of the two branches.

One end of each branch is disposed with a coupling base corresponding to the branch coupling portion. The coupling base is in the shape of an open cylinder cover and has disposed thereon a central pole and a locating pole, the central pole corresponding to the central hole of the circular plate, the locating pole corresponding to a corresponding first/second locating hole. The coupling bases of the two branches are respectively disposed at upper side and lower side of the circular plate, the pivot being correspondingly disposed in the central hole of the circular plate and the central pole on the coupling base, the two locating members being respectively disposed in corresponding locating poles and the first locating hole/the second locating hole.

Each branch further comprises an extension arm extending from the coupling base, a wheel coupling element being rotatablely disposed on the other end of the extension arm, the wheel coupling element being coupled to an axle of a corresponding wheel.

The wheel coupling element is disposed with an axle mounting hole adapted to the axle, an pin hole adapted to an axis pin, a first state hole corresponding to the first stable state, and a second state hole corresponding to the second stable state.

Each branch further comprises a cover and an axis pin matching with the wheel coupling element, the cover having disposed thereon a pin hole and a limiting block, the pin hole corresponding to the pin hole on the wheel coupling element, the limiting block corresponding to the first state hole/the second state hole, the axis pin being mounted through the pin hole of the cover and the pin hole of the wheel coupling element.

The other end of the extension arm is disposed with two extrusive mounting arms, the two mounting arms having disposed thereon pin holes for disposing the axis pin so that the wheel coupling element may be rotatablely fixed to the other end of the extension arm.

The extension arm comprises an outer tube extending from a side of the coupling base and an inner tube adapted to the outer tube, an end of the inner tube being extended into the outer tube while the two mounting arms being disposed at the other end of the inner tube.

The two wheels in the double-wheel assembly are aligned in parallel with each other when the supporting beam is in the second stable state.

BRIEF DESCRIPTION OF THE DRAWINGS

FIG. 3 shows the supporting beam in a first stable state while
FIG. 4 shows the supporting beam in a second stable state.

Figure 1:
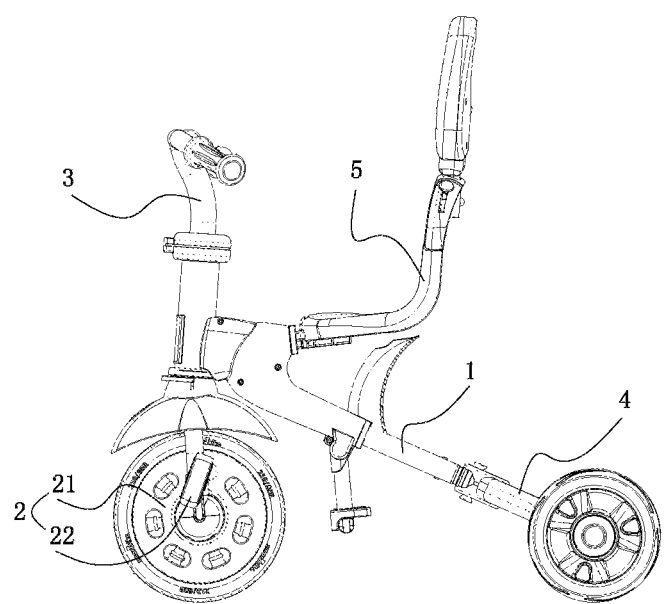
FIG. 1 is a front view of the tricycle of the utility model.

The reference numerals are listed as follows: 1: frame; 2: single-wheel assembly; 3: handlebar assembly; 4: double-wheel assembly; 41: branch; 411: coupling base; 4111: central pole; 4112: locating pole; 412: outer tube; 413: inner tube; 414: mounting base; 4141: pin hole; 415: wheel coupling element; 4151: axle mounting hole; 4152: pin hole; 4153: first state hole of wheels; 4154: second state hole of wheels; 416: cover; 4161: pin hole; 4162: limiting block; 417: axis pin; 43: wheel; 431: wheel axle; 45: coupling assembly; 451: frame coupling portion; 452: branch coupling portion; 4521: central hole; 4522: first locating hole; 4523: second locating hole; 47: locating member; 5: saddle.

DETAILED DESCRIPTION OF EMBODIMENTS

In the following description, the present utility model is further described in detail with reference to accompanying drawings.

With reference to FIG. 1, the tricycle of the present utility model generally comprises: a frame 1, a single-wheel assembly 2 and a handlebar assembly 3 disposed at a longitudinal end of the frame 1, a double-wheel assembly 4 disposed at the other longitudinal end of the frame 1, and a saddle 5 disposed on the frame 1. The single-wheel assembly 2 comprises a steering wheel and pedals for driving the steering wheel to roll. The frame 1 may be extended from high to low along longitudinal direction, and pedals may be disposed at the middle of the frame 1 for feet resting.

Figure 2:
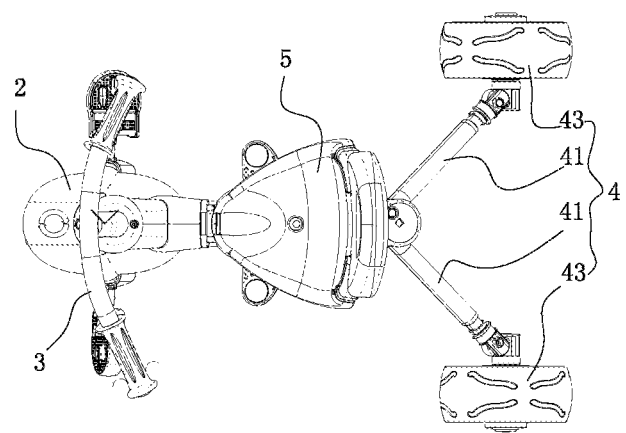
FIG. 2 is a top view of the tricycle of the utility model.
Figure 3:
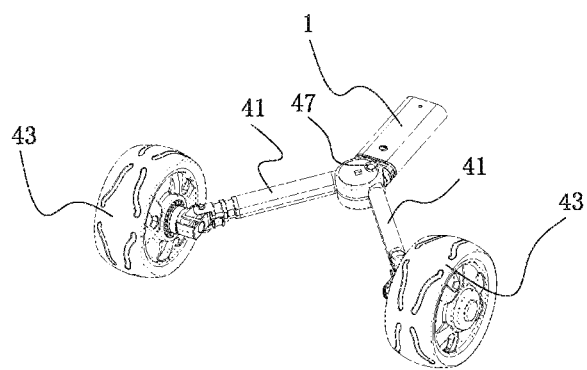
FIG. 3 and FIG. 4 are 3D views of two states of the frame and the double-wheel assembly according to the utility model, where
Figure 4:
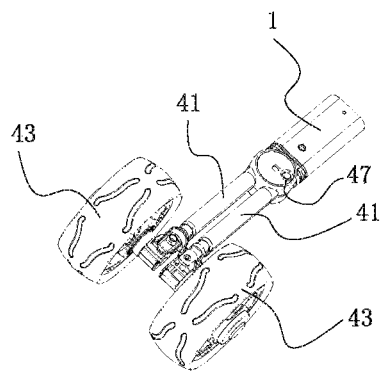

With reference to FIG. 2, the double-wheel assembly 4 comprises a supporting beam having two branches 41 of same structures, and two wheels 43 disposed on the supporting beam. More particularly, the two wheels 43 are respectively disposed on the two branches 41. FIG. 2 to FIG. 4 shows the supporting beam in a first stable state where the two branches 41 are open (i.e. open state), and the supporting beam in a second stable state where the two branches 41 are put together side by side (i.e. put-together state).

With reference to FIG. 3, the supporting beam further comprises a locating member 47 matching with the branches 41 for maintaining the branches 41 in a first stable state.

With reference to FIG. 4, the supporting beam is in a second stable state where the two branches 41 are put together side by side. In this state, the two wheels 43 may be aligned in parallel with each other.

Figure 5:
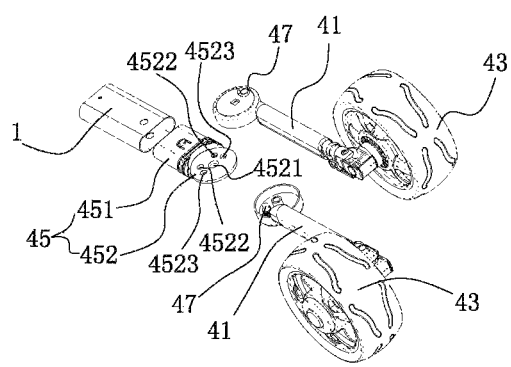
FIG. 5 and FIG. 6 are 3D exploded views of the frame and the double-wheel assembly from two different perspectives according to the utility model, where the supporting beam is in a second stable state.
Figure 6:
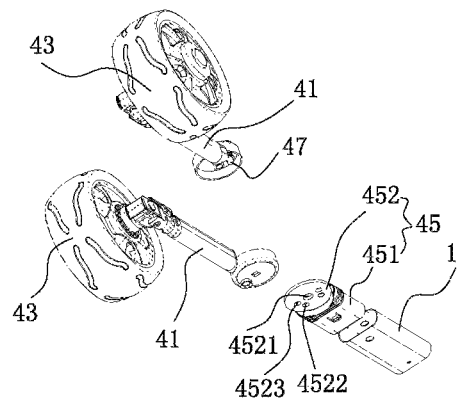

With reference to FIG. 5 and FIG. 6, the supporting beam further comprises a coupling assembly 45 for coupling the frame 1, a pivot (not shown) for rotatablely coupling the two branches 41 to the coupling assembly 45, and two locating members 47 respectively for locating the two branches 41 in one of the two stable states.

The coupling assembly 45 comprises a frame coupling portion 451 coupled to the frame 1 and a branch coupling portion 452 coupled to the two branches 41. The frame coupling portion 451 may be inserted into the frame 1 and may be fixed via fastening members such as screw bolts. The branch coupling portion 452 comprises a circular plate coupled to the frame coupling portion 451. The circular plate has disposed thereon a central hole 4521, two first locating holes 4522 respectively corresponding to a first stable state of the two branches 41, and two second locating holes 4523 respectively corresponding to a second stable state of the two branches 41.

Figure 7:
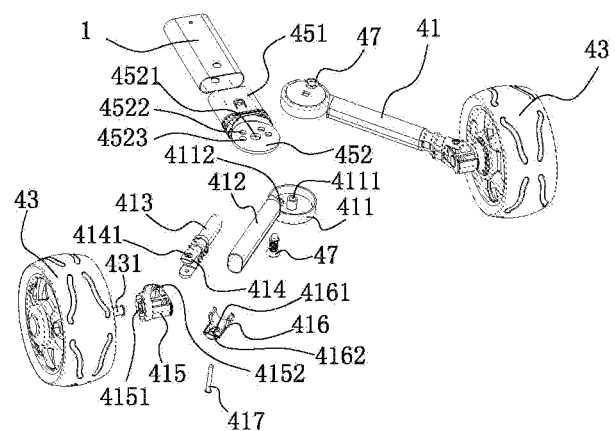
FIG. 7 and FIG. 8 are 3D exploded views of the frame and the double-wheel assembly from two different perspectives according to the utility model, where the supporting beam is in a first stable state.
Figure 8:
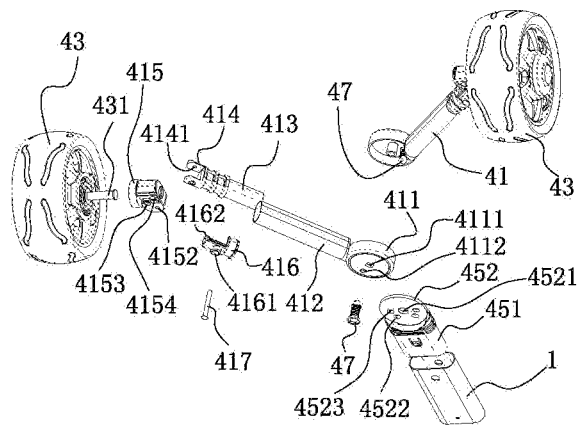

With reference to FIG. 7 and FIG. 8, each branch 41 comprises: a coupling base 411 corresponding to the branch coupling portion 452; an extension arm extending from the coupling base 411, the extension arm comprising an outer tube 412 extending from a side of the coupling base 411 and an inner tube 413 adapted to the outer tube 412, an end of the inner tube 413 being extended inside into the outer tube 412; two mounting arms 414 disposed at the other end of the inner tube 413; a wheel coupling element 415 rotatablely disposed on the two mounting arms 414; and a cover 416 and an axis pin 417 matching with the wheel coupling element 415.

The coupling base 411 is in the shape of an open cylinder cover. The coupling base 411 has disposed thereon a central pole 4111 and a locating pole 4112. The central pole 4111 corresponds to the central hole 4521 of the circular plate 452. The locating pole 4112 corresponds to a first locating hole 4522/a second locating hole 4523 on the circular plate 452 that corresponds to a corresponding branch 41. The coupling bases 411 of the two branches 41 are oppositely disposed at the upper side and the lower side of the circular plate 452 respectively. The pivot is correspondingly disposed in the central hole 4521 of the circular plate 452 and the central pole 4111 on the coupling base 411. The two locating members 47 are respectively disposed in the corresponding locating pole 4112 and the first locating hole 4522/the second locating hole 4523.

The two mounting arms 414 integratedly extend from the other end of the inner tube 413. The two mounting arms 414 have disposed thereon pin holes 4141 for mounting an axis pin 417 so that the wheel coupling element 415 may rotate around the axis pin 417.

The wheel coupling element 415 has disposed thereon an axle mounting hole 4151 adapted to the wheel axle, a pin hole 4152 adapted to the axis pin 417, a first state hole 4153 of wheels that corresponds to the first stable state, and a second state hole 4154 of wheels that corresponds to the second stable state.

The cover 416 has disposed thereon a pin hole 4161 and a limiting block 4162. The pin hole 4161 corresponds to the pin hole 4152 on the wheel coupling element 415. The limiting block 4162 corresponds to the first state hole 4153 of wheels/a second state hole 4154 of wheels. The axis pin 417 is mounted in the pin hole 4161 of the cover 416 and the pin hole 4152 of the wheel coupling element 415.

With the tricycle of the present utility model, the branches 41 may switch between open state and put-together state merely by operating the locating members 47. Further, the states of wheels 43 in different states of the supporting beam may be adjusted merely by operating the cover 416 so that the supporting beam may be easily folded. Besides, since the space occupied by the supporting beam in put-together state is largely reduced compared to the space occupied by the supporting beam in open state, the usage convenience of the tricycle of the present utility model may be improved compared with that in the prior art. The tricycle of the present utility model, for example, may be folded and carried in vehicles such as a car when traveling.

The above descriptions are merely preferred embodiments of the present utility model, and are not intended to limit the implementations of the present utility model. According to the primary concept and spirit of the present utility model, those skilled in the art may readily alter or modify these embodiments. The scope of protection of the present utility model is limited by the claims.

The invention claimed is:

1. A tricycle with foldable double-wheel assembly, comprising: a frame; a single-wheel assembly; a handlebar assembly, matching with said single-wheel assembly, to control steering; and a double-wheel assembly, respectively disposed at front end and rear end of said frame, comprising: a supporting beam and two wheels disposed on said supporting beam; wherein said supporting beam comprises two branches of same structures, said two wheels being respectively disposed on said two branches, said supporting beam having a first stable state, where said two branches are open, and a second stable state, where said two branches are put together side by side; wherein said supporting beam further comprises a coupling assembly for coupling to said frame, a pivot for rotatably coupling said two branches to said coupling assembly, and two locating members respectively for locating said two branches in one of the first stable state and the second stable state, and wherein said coupling assembly comprises a frame coupling portion coupled to said frame and a branch coupling portion coupled to said two branches, said branch coupling portion comprising a plate, said plate having disposed thereon a central hole; and wherein said plate further comprises two first locating holes respectively corresponding to a first stable state of said two branches, and two second locating holes respectively corresponding to a second stable state of said two branches.

2. The tricycle of claim 1, wherein in the second stable state, the two wheels in the double-wheel assembly are aligned in parallel with each other.

3. A tricycle with foldable double-wheel assembly, comprising: a frame; a single-wheel assembly; a handlebar assembly, matching with said single-wheel assembly, to control steering; and a double-wheel assembly, respectively disposed at front end and rear end of said frame, comprising: a supporting beam and two wheels disposed on said supporting beam; wherein said supporting beam comprises two branches of same structures, said two wheels being respectively disposed on said two branches, said supporting beam having a first stable state, where said two branches are open, and a second stable state, where said two branches are put together side by side; and wherein said supporting beam further comprises a coupling assembly for coupling to said frame, a pivot for rotatably coupling said two branches to said coupling assembly, and two locating members respectively for locating said two branches in one of the first stable state and the second stable state, and wherein said coupling assembly comprises a frame coupling portion coupled to said frame and a branch coupling portion coupled to said two branches, said branch coupling portion comprising a plate, said plate having disposed thereon a central hole; and wherein said plate further comprises two first locating holes respectively corresponding to a first stable state of said two branches, and two second locating holes respectively corresponding to a second stable state of said two branches; wherein one end of each branch is disposed with a coupling base corresponding to said branch coupling portion, said coupling base being in the shape of an open cylinder cover and having disposed thereon a central pole and a locating pole, said central pole corresponding to said central hole of said plate, said locating pole corresponding to a respective first or second locating hole; the coupling bases of said two branches being respectively disposed at an upper side and lower side of said plate, said pivot being correspondingly disposed in the central hole of said plate and the central pole on each coupling base, said two locating members being respectively disposed in corresponding locating poles and the first locating hole or the second locating hole.

4. A tricycle with foldable double-wheel assembly, comprising: a frame; a single-wheel assembly; a handlebar assembly, matching with said single-wheel assembly, to control steering; and a double-wheel assembly, respectively disposed at front end and rear end of said frame, comprising: a supporting beam and two wheels disposed on said supporting beam; wherein said supporting beam comprises two branches of same structures, said two wheels being respectively disposed on said two branches, said supporting beam having a first stable state, where said two branches are open, and a second stable state, where said two branches are put together side by side; wherein said supporting beam further comprises a coupling assembly for coupling to said frame, a pivot for rotatably coupling said two branches to said coupling assembly, and two locating members respectively for locating said two branches in one of the first stable state and the second stable state, and wherein said coupling assembly comprises a frame coupling portion coupled to said frame and a branch coupling portion coupled to said two branches, said branch coupling portion comprising a circular plate, said circular plate having disposed thereon a central hole; and wherein said circular plate further comprises two first locating holes respectively corresponding to a first stable state of said two branches, and two second locating holes respectively corresponding to a second stable state of said two branches; wherein one end of each branch is disposed with a coupling base corresponding to said branch coupling portion, said coupling base being in the shape of an open cylinder cover and having disposed thereon a central pole and a locating pole, said central pole corresponding to said central hole of said circular plate, said locating pole corresponding to a respective first or second locating hole; the coupling bases of said two branches being respectively disposed at an upper side and lower side of said circular plate, said pivot being correspondingly disposed in the central hole of the circular plate and the central pole on each coupling base, said two locating members being respectively disposed in corresponding locating poles and the first locating hole or the second locating hole; wherein each branch further comprises: an extension arm, extending from the coupling base, a wheel coupling element, being rotably disposed on the other end of said extension arm, and wherein said wheel coupling element is being coupled to an axle of a corresponding wheel.

5. The tricycle of claim 4, wherein said wheel coupling element is disposed with an axle mounting hole for the wheel axle, a first state hole corresponding to the first stable state, and a second state hole corresponding to the second stable state.

6. The tricycle of claim 5, wherein each branch further comprises a cover and an axis pin matching with the wheel coupling element, said cover having disposed thereon a pin hole and a limiting block, said pin hole corresponding to a pin hole on said wheel coupling element, said limiting block corresponding to the first state hole or the second state hole, said axis pin being mounted through the pin hole of said cover and the pin hole of said wheel coupling element.

7. The tricycle of claim 6, wherein the other end of the extension arm is disposed with two extrusive mounting arms, said two mounting arms having disposed thereon pin holes for mounting the axis pin so that said wheel coupling element is rotatably fixed to said other end of said extension arm.

8. The tricycle of claim 7, wherein said extension arm comprises an outer tube extending from a side of said coupling base and an inner tube adapted to said outer tube, an end of said inner tube being extended into said outer tube while said two mounting arms being disposed at the other end of said inner tube.

* * * * *